No. 783,986. PATENTED FEB. 28, 1905.
H. H. TUNIS.
MONORAIL CAR BALANCING TRUCK.
APPLICATION FILED DEC. 15, 1904.
2 SHEETS—SHEET 2.
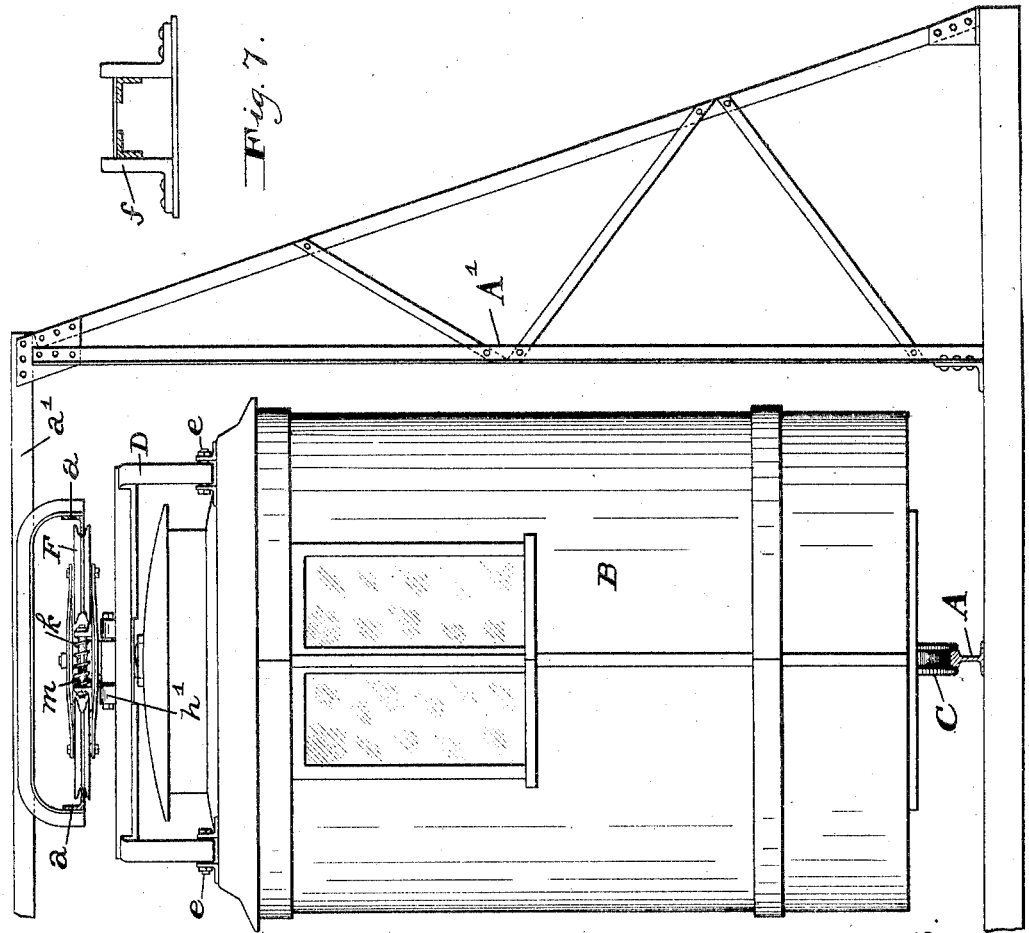
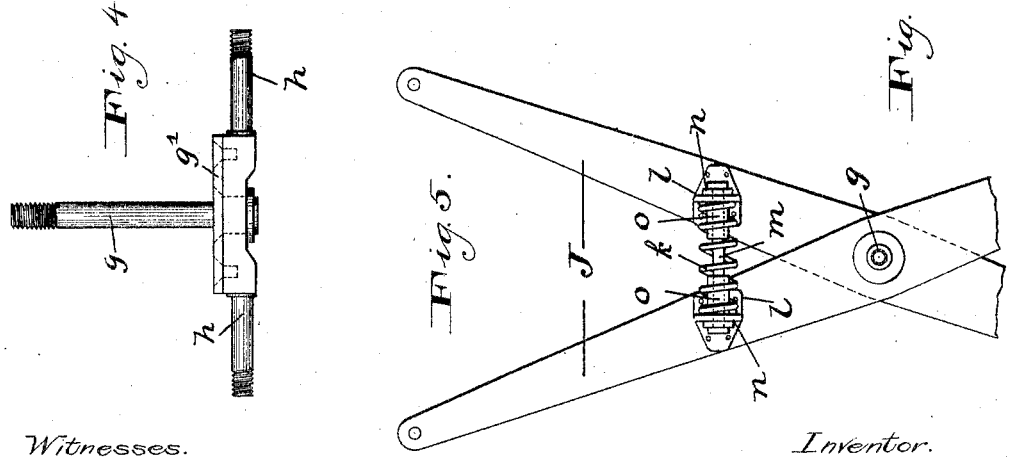
Witnesses.
J. H. Sirich Jr.
G. Ferdinand Vogt.
Inventor.
Howard H. Tunis
By Mann & Co,
Attorneys.

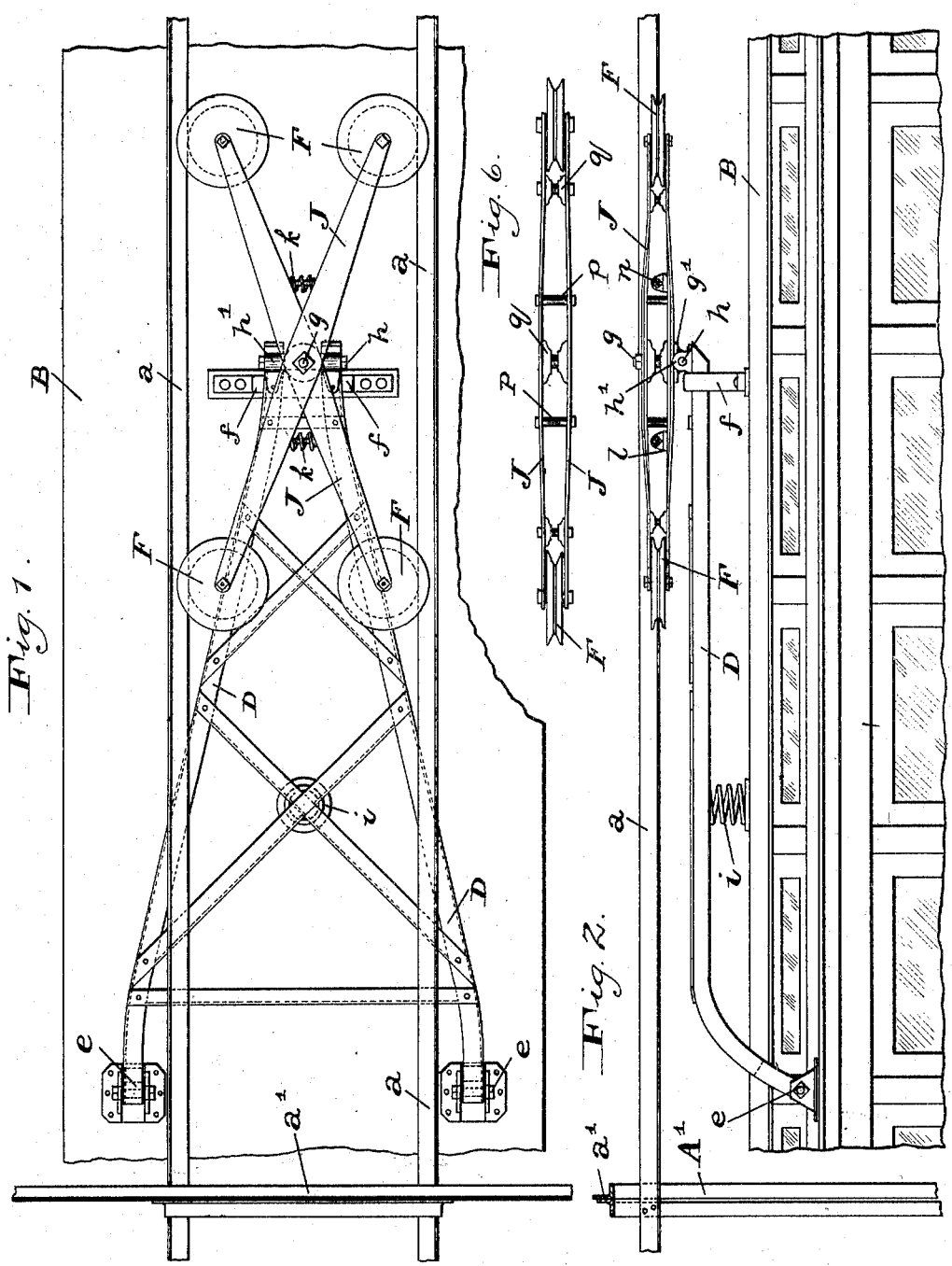

No. 783,986.

Patented February 28, 1905.

UNITED STATES PATENT OFFICE.

HOWARD H. TUNIS, OF WINDSOR HILLS, MARYLAND, ASSIGNOR TO THE AMERICAN MONORAIL COMPANY, A CORPORATION OF SOUTH DAKOTA.

MONORAIL-CAR BALANCING-TRUCK.

SPECIFICATION forming part of Letters Patent No. 783,986, dated February 28, 1905.

Application filed December 15, 1904. Serial No. 236,916.

*To all whom it may concern:*

Be it known that I, HOWARD H. TUNIS, a citizen of the United States, residing at Windsor Hills, in the county of Baltimore and State of Maryland, have invented certain new and useful Improvements in Monorail-Car Balancing-Trucks, of which the following is a specification.

This invention relates to improvements in balancing-trucks to be carried on the roof of a car of a monorail system. In this class of railways a single rail is employed on the road-bed and two parallel guide-rails or balancing-rails are used in an elevated position above the road-bed. Truck wheels or rollers are on the roof of the car and revolve in a horizontal plane and bear laterally against the elevated rails and serve to maintain the car in an upright position.

One object of the invention is to provide an improved construction of this class of truck that will contract or expand as to its width to a limited extent.

Another object of the invention is to provide for a monorail system a four-wheel-car roof-truck and an arm hinged to the roof of the car to carry said truck so that said parts will be capable of the following movements and variations of position: first, yielding in a vertical direction more or less above the car-roof; second, expansible as to width; third, tilting on its center in a vertical plane; fourth, swiveling on its center in a horizontal plane, and, fifth, neither the hinged arm nor the pivot on which the truck swivels in a horizontal plane will have any sidewise movement relative to the car when the car sways or lurches sidewise.

The invention is illustrated in the accompanying drawings, in which—

Figure 1 is a top plan view of part of a car, showing the arm, one truck, and the guide-rails above the roof of the car. Fig. 2 is a side elevation of the upper part of car and showing one guide-rail, the arm, and the truck. Fig. 3 is an end elevation of a car and showing the single rail, the elevated guide-rails, and the truck. Fig. 4 is a view, on a larger scale, of the combined swivel-pivot and vertically-tilting pivot. Fig. 5 is a bottom or under side view, on a larger scale than shown in Fig. 1, of the expansible truck-bars and expansion-spring. Fig. 6 shows a side view of one bar of the truck. Fig. 7 shows the side stays for the arm.

In the drawings, A designates the bearing-rail, which may be on a road-bed or elevated, as desired, and of any suitable construction. A structural upright angle-iron frame A', of any suitable construction and located at intervals along the road-bed, supports a pair of overhead balance-rails $a$. These rails are also constructed of angle-iron and are suspended from a beam $a'$. The two balance or guide rails $a$ are parallel and a uniform distance apart. In practice about thirty inches is deemed suitable. The car B is supported at either end by a pair of flanged wheels C, which are connected to suitable power mechanism.

The car may be of any suitable construction, but is preferably long and narrow and pointed at each end.

The truck presently to be described is carried at the free end of an arm D, whose secured end is hinged or jointed at $e$ to the roof of the car in order to permit the free end to be raised or lowered vertically. This arm may have any desired construction, but its free end should have no sidewise movement with respect to the car. The sidewise movement of the arm is prevented by the two vertical stays $f$, between which the free end of the said arm may move up and down. The stays are securely fastened to the car-roof structure. The free end of this arm D has a vertically-projecting pivot $g$, carried on a rock-shaft pivot $h$. (Shown separately in Fig. 4.) The ends of the rock-shaft are in bearings $h'$. A bearing-plate $g'$ is fixed on the rock-shaft at the base of the vertical pivot $g$. A suitable spring $i$ is interposed between the free end of the arm D and the roof of the car B to keep the said free end raised, but which will yield to allow the free end to be depressed vertically.

Each car will be equipped on its roof with two improved balancing-trucks, one truck being near each end of the car.

The improved balancing-truck has two crossed arms, each of which is made of two plates or bars J, one above the other and separated or spaced apart, and a grooved roller F is at the ends of each arm and revolves between the said two bars on a pin. The two arms are crossed—that is, one arm is entered between the two bars J of the other arm. The two plates or bars J of the inner arm (see Fig. 6) are trussed or bolted together by bolts and sleeves $p$, which cause the said plates to clamp the blocks $q$ between the said two plates. Both of the crossed arms have a central hole and are pivoted on the said vertically-projecting pivot $g$, carried on the free end of the hinged arm D. The lowermost bar J of the crossed arms rests upon the bearing-plate $g'$, and both arms swivel on their center in a horizontal plane. The crossed arms are independently movable to a limited extent on the vertical pivot $g$ and are kept normally expanded, so as to force the rollers F against the two guide-rails $a$ by two spiral springs $k$. These springs are shown in Fig. 1, but the construction of one spring more plainly in Fig. 5, which is a bottom view of the crossed truck-arms on a larger scale. Each arm has an angle-plate $l$ secured to it, and a bolt $m$ extends across from one arm to the other and passes loosely through the vertical flanges of these angle-plates, and heads or nuts $n$ on the outer ends of the bolt serve to restrict the expansion of the crossed truck-arms to a definite limit. Two sleeves $o$ are on the bolt $m$, and when the crossed arms of the truck are pressed together to a certain extent these sleeves will abut endwise and prevent any further compression of the crossed arms. The spiral spring $k$ surrounds the bolt $m$ and the sleeves $o$ and bears against the vertical flanges of the angle-plates $l$.

A spring, bolt, and sleeve are on each side of the pivot $g$.

Having thus fully described my invention, what I claim as new, and desire to secure by Letters Patent, is—

1. In a monorail system, the combination of the single track-rail; two parallel balance-rails supported in an elevated position and in alinement with the single track-rail; a car provided with grooved wheels to travel on the single track-rail; an arm having one end hinged to the roof of the car and its other end free to make vertical movement; and a four-wheeled balancing-truck carried at the free end of said arm—said truck comprising two crossed arms each arm carrying two wheels and the two arms being independently movable in a horizontal plane.

2. In a monorail system, the combination of the single track-rail; two parallel balance-rails supported in an elevated position and in alinement with the single track-rail; a car provided with grooved wheels to travel on the single track-rail; an arm having one end hinged to the roof of the car and its other end free to make vertical movement; and a balancing-truck carried at the free end of said arm and with its wheels between said two elevated parallel rails—said truck being expansible in width.

3. In a monorail system, the combination of the single track-rail; two parallel balance-rails supported in an elevated position and in alinement with the single track-rail; a car provided with grooved wheels to travel on the single track-rail; an arm having one end hinged to the roof of the car and its other end free to make vertical movement, and a balancing-truck carried at the free end of said arm and having four wheels which take between said two elevated rails, said truck pivoted to tilt on its center in a vertical plane.

4. In a monorail system, the combination of the single track-rail; two parallel balance-rails supported in an elevated position and in alinement with the single track-rail; a car provided with grooved wheels to travel on the single track-rail; an arm having one end hinged to the roof of the car and its other end free to make vertical movement, and a balancing-truck carried at the free end of said arm and having four wheels which take between said two elevated rails, said truck being pivoted at its center to swivel in a horizontal plane.

5. In a monorail system, the combination of the single track-rail; two parallel balance-rails supported in an elevated position and in alinement with the single track-rail; a car provided with grooved wheels to travel on the single track-rail; an arm having one end hinged to the roof of the car and its other end free to make vertical movement; a vertical stay secured to the car-roof to prevent sidewise movement of the free end of said hinged arm; and a truck pivoted at the free end of said arm so as to tilt on its center in a vertical plane.

6. In a monorail system, the combination of the single bearing-rail; two elevated balance-rails; a car; a balancing-truck on the car for sustaining the latter in an upright position, said balancing-truck comprising two crossed arms centrally pivoted together and each arm carrying a roller at both of its ends, a spring to keep the arms normally expanded, and means to restrict such expansion to a definite limit.

7. In a monorail system, the combination of the single bearing-rail; two elevated balance-rails; a car; a balance-truck on the car for sustaining the latter in an upright position, said balancing-truck comprising two crossed arms centrally pivoted together and each arm carrying a roller at both of its ends to contact with the balance-rails, a spring to keep the arms normally expanded and means to limit the compression of said crossed arms.

8. In a monorail system, the combination of the single bearing-rail; two elevated balance-rails; a car; a balancing-truck on the car for sustaining the latter in an upright position, said balancing-truck having two arms each consisting of two bars, J, one above the other and spaced apart, and the two arms crossed by one arm being between the said two bars of the other arm, a pivot-bolt uniting the two arms at their centers, and a roller at each end of the arms and revoluble between the said two bars.

In testimony whereof I affix my signature in presence of two witnesses.

HOWARD H. TUNIS.

Witnesses:
CHARLES B. MANN, Jr.,
G. FERDINAND VOGT.